(No Model.)
A. M. MOZIER.
SEMAPHORE FOR RAILROAD SERVICE.
No. 466,614. Patented Jan. 5, 1892.
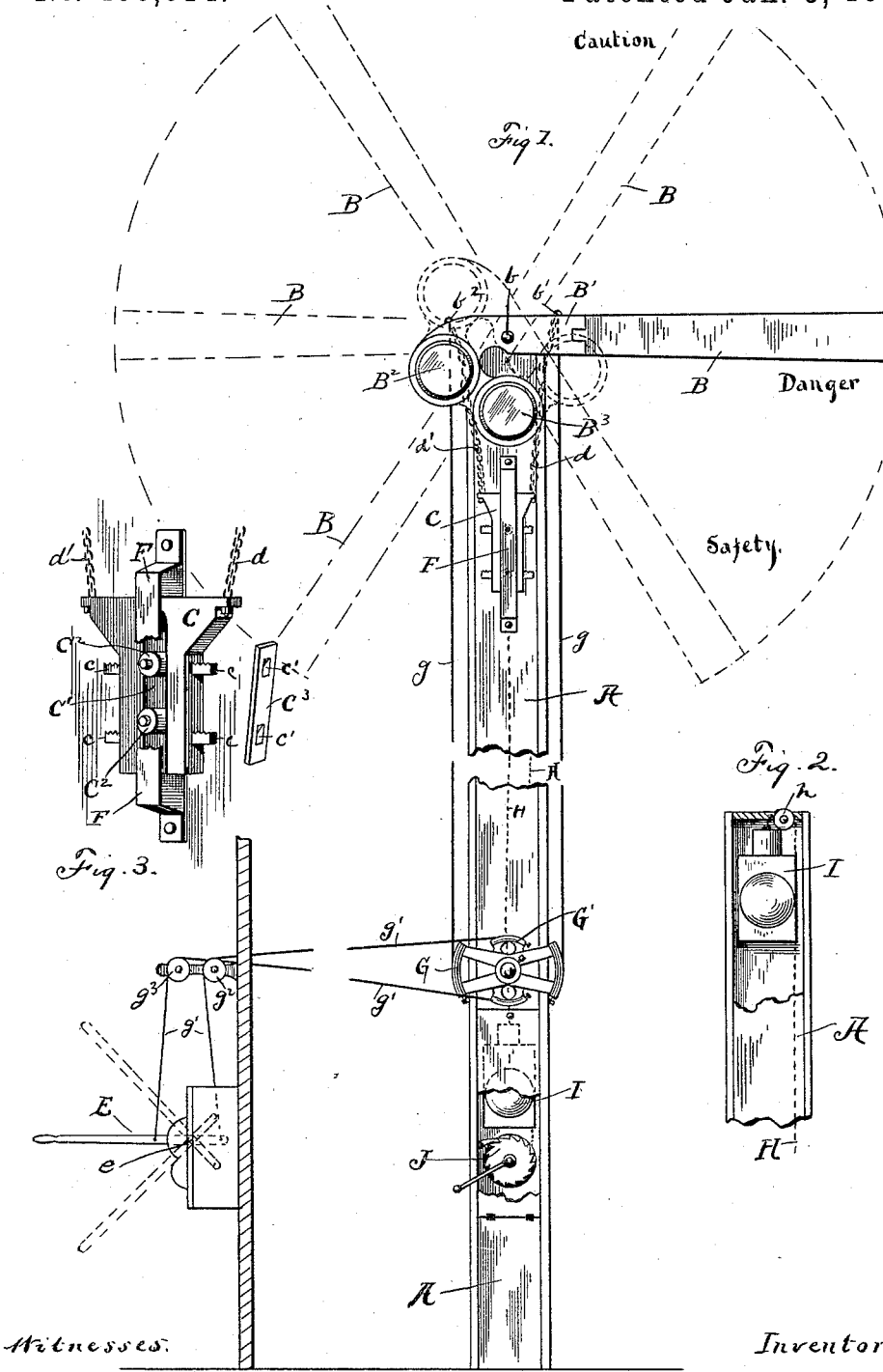
Witnesses.
E. Byron Gilchrist
Inventor
Albert M. Mozier

UNITED STATES PATENT OFFICE.

ALBERT M. MOZIER, OF CLEVELAND, OHIO.

SEMAPHORE FOR RAILROAD SERVICE.

SPECIFICATION forming part of Letters Patent No. 466,614, dated January 5, 1892.

Application filed April 6, 1891. Serial No. 387,753. (No model.)

*To all whom it may concern:*

Be it known that I, ALBERT M. MOZIER, of Cleveland, in the county of Cuyahoga and State of Ohio, have invented certain new and useful Improvements in Semaphores for Railroad Service; and I do hereby declare the following to be a full, clear, and exact description of the invention, such as will enable others skilled in the art to which it pertains to make and use the same.

My invention relates to improvements in semaphores for railroad service; and it consists in certain features of construction and in combination of parts hereinafter described, and pointed out in the claims. Heretofore with a semaphore for such service the arm thereof was extended in approximately a horizontal position as a danger-signal and was depressed or turned down to an inclined position for a safety-signal. With my improved semaphore I add a third position, to wit: The arm is turned upward to an inclined position to indicate "caution," the arrangement being such that the arm when left free automatically returns to its normal position, indicating "danger." There is a light displayed for night service, the white or natural light indicating "safety," a red light indicating "danger," and a green light indicating "caution," the red and green glasses being arranged and connected with the semaphore-arm in such a manner as to indicate the same as the position of the arm. Heretofore the operator has usually been obliged to climb a ladder in placing and in removing the lamp or light. As this is troublesome work, especially on cold, windy, or rainy days, I have devised means of elevating and lowering the lamp by a windlass operated from the ground, the lamp in its ascent and its descent passing through the cavity of the semaphore-post.

In the accompanying drawings, Figure 1 is a side elevation, portions being broken away to show the internal construction. Fig. 2 shows the interior of the upper sections of the post. Fig. 3 is a perspective view of the weight and attachments for operating the semaphore-arm.

A represents a hollow post, usually constructed of four planks secured together in the form of a box. At the top of the post and on the side facing the approaching trains to be signaled is pivoted at *b* the signal arm or semaphore proper B. The respective positions of the arm B in indicating "danger," "safety," and "caution" are approximately as shown in Fig. 1, the normal position being that of "danger," and means are provided for automatically returning the arm when free to its normal or horizontal position indicating "danger."

C is a weight connected by flexible members *d d'*, such as chains, cables, or cords, and I will suppose the latter, members *d d'* connecting with arm B at equal distances on each side of the fulcrum of the arm, as at $b'$ $b^2$, this weight being supported alike by both cords when the arm is in its normal or horizontal position indicating "danger." If the arm is turned upward from such position to indicate "caution," the weight is elevated by means of cord *d*, and if the arm is depressed to indicate "safety" the weight is elevated by means of cord *d'*, and from either extreme position the gravity of the weight will return the arm to its normal position. In order to guide the weight and to hold it from tilting as the different cords, respectively, act on the weight, and to do this by means simple and as nearly frictionless as possible, the weight is constructed with a central longitudinal slot C', in which slot operate rollers $C^2$ $C^2$, the trunnions of these rollers being journaled in suitable bearings connected with the post.

F F are merely rub-irons secured to the post and embracing the weight loosely.

As different semaphore-arms are likely to vary somewhat in size and gravity, and as the gravity of the weight should be such as to always actuate the arm promptly, I provide a medium-sized primary weight C, having lateral arms *c c*, and I provide light secondary weights $C^3$, having slots *c'* for embracing arms *c c*. The upper surfaces of these arms are usually notched for holding weights $C^3$ in place. However, keys or any suitable means may be provided for the purpose. One, two, or more weights $C^3$ may be added, as may be deemed necessary, to operate the semaphore-arm with sufficient promptness.

*g g* are cords or other flexible members connecting with arm B on opposite sides and equal distances from the fulcrum of this arm, these cords leading downward and connecting with segmental sheave G on opposite sides of the latter. By the side of this sheave and connected therewith is a segmental sheave G' and from the latter lead cords g' g' laterally into the operator's room, these cords leading, respectively, over idle sheaves or rollers $g^2$ and $g^3$, and from thence leading downward and connecting with lever E on opposite sides and equidistant from the fulcrum e of this lever, the arrangement being such that the position of lever E corresponds with the position of the semaphore-arm B. Hence, if the operator sees that lever E extends in a horizontal position he knows that the semaphore-arm is in the corresponding position, indicating "danger," and so of the other positions of the lever and semaphore-arm. There are suitable notches or catches provided for holding lever E respectively in the upwardly and downwardly inclined positions; but nothing of course is required to hold the arm in a horizontal position, as this is secured by the weight C aforesaid.

By manipulating lever E the operator can shift the semaphore-arm to the position required, having only to release the arm in order to display the danger-signal. There is a door near the bottom of the post for giving access to the interior, and inside the post a cord H leads over sheave h, the latter being located at the top of the post. To the one end of this cord is attached a lantern I, and the other end of the cord is attached to and adapted to wind on a small windlass J, the crank of this windlass being removable, the crank being usually kept in the operator's room. By operating this windlass the lantern can be raised or lowered, the lantern in its elevated position being opposite an opening in the side wall of the post, so that the light is displayed through this opening in the direction in which approach the trains that are to be signaled.

B' is a broad metal plate constituting a part of the semaphore-arm adjacent to the fulcrum thereof, this plate having two openings $B^2$ and $B^3$, each opening in turn being opposite the lamp with the different positions of the semaphore-arm. Opening $B^2$, that is opposite the lamp when the semaphore-arm is in position indicating "caution," has a green light, and opening $B^3$, that is opposite the lamp when the semaphore-arm is in position indicating "danger," has a red light, and when the semaphore-arm is in position indicating "safety" member B' does not extend in front of the lamp, and hence the normal white light of the lamp is displayed in such case. Hence the different-colored lights indicate the same as the different positions of the semaphore-arm. Usually the opposite side of the post is provided with a semaphore-arm, (see dotted lines, Fig. 1,) this second arm and the mechanism for operating it being precisely the same as that just described. The face of each arm presented toward the approaching train to be signaled is painted red, while the back face of each arm is painted white, so that the two arms are never mistaken the one for the other, and the arm extending toward the right hand, as seen from the approaching train, being the one used for signaling such train. In case of two semaphore-arms the walls of the post are provided with two openings on opposite sides of the post, so that the one lamp will answer for signaling in opposite directions.

What I claim is—

1. A semaphore-arm having a weight attached by two cords or flexible members connecting with the arm on opposite sides of the fulcrum of the arm, substantially as set forth.

2. A semaphore-arm having a weight suspended therefrom and connected with the arm on both sides of its fulcrum, said arm having different-colored glasses thereon, and means for changing the position of the arm, substantially as set forth.

In testimony whereof I sign this specification, in the presence of two witnesses, this 6th day of March, 1891.

ALBERT M. MOZIER.

Witnesses:
C. H. DORER,
WARD HOOVER.